United States Patent
Pihl et al.

(10) Patent No.: US 11,683,595 B2
(45) Date of Patent: Jun. 20, 2023

(54) WEARABLE CAMERA AND A METHOD FOR ENCODING VIDEO CAPTURED BY THE WEARABLE CAMERA

(71) Applicant: Axis AB, Lund (SE)

(72) Inventors: Fredrik Pihl, Lund (SE); Mattias Pettersson, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 17/370,141

(22) Filed: Jul. 8, 2021

(65) Prior Publication Data
US 2022/0053125 A1 Feb. 17, 2022

(30) Foreign Application Priority Data
Aug. 17, 2020 (EP) .................... 20191260

(51) Int. Cl.
*H04N 5/232* (2006.01)
*H04N 7/18* (2006.01)
(Continued)

(52) U.S. Cl.
CPC ............ *H04N 23/80* (2023.01); *H04N 7/185* (2013.01); *H04N 19/102* (2014.11); *H04N 19/134* (2014.11); *H04N 19/139* (2014.11); *H04N 19/167* (2014.11); *H04N 19/182* (2014.11); *H04N 19/61* (2014.11); *H04N 19/169* (2014.11);
(Continued)

(58) Field of Classification Search
CPC ........... H04N 5/23229; H04N 19/102; H04N 19/134; H04N 19/139; H04N 19/167; H04N 19/182; H04N 19/61; H04N 7/185; H04N 19/169; H04N 19/25; H04N 19/48; H04N 2101/00
See application file for complete search history.

(56) References Cited

U.S. PATENT DOCUMENTS 6,133,943 A * 10/2000 Needham ............. G06T 3/4038
348/E5.053
9,094,681 B1 7/2015 Wilkins et al.
(Continued)

FOREIGN PATENT DOCUMENTS

JP 3687159 B2 * 11/1995
JP 3746739 B2 * 6/2002
(Continued)

OTHER PUBLICATIONS

Yorozu T Translation of JP-3687159, Nov. 1995 (Year: 1995).*
(Continued)

*Primary Examiner* — Zaihan Jiang
(74) *Attorney, Agent, or Firm* — Volpe Koenig (57) ABSTRACT

A method and wearable camera for encoding video captured by a wearable camera determines a centre of rotation for an image frame to be encoded. The centre of rotation relates to a rotation of the wearable camera at the time of capturing the video and the image frame comprises multiple groups of pixels. Furthermore, compression levels are set for the multiple groups of pixels of the image frame. The compression levels for the multiple groups of pixels of the image frame are set such that a level of compression increases with a radial distance from the centre of rotation. The image frame is encoded using the compression levels.

15 Claims, 2 Drawing Sheets

(51) Int. Cl.
H04N 19/167 (2014.01)
H04N 19/182 (2014.01)
H04N 19/139 (2014.01)
H04N 23/80 (2023.01)
H04N 19/102 (2014.01)
H04N 19/134 (2014.01)
H04N 19/61 (2014.01)
*H04N 19/169* (2014.01)
*H04N 19/25* (2014.01)
*H04N 19/48* (2014.01)
*H04N 101/00* (2006.01)

(52) U.S. Cl.
CPC .............. *H04N 19/25* (2014.11); *H04N 19/48* (2014.11); *H04N 2101/00* (2013.01)

(56) References Cited

U.S. PATENT DOCUMENTS

| | | | |
|---|---|---|---|
| 10,200,715 B2 | 2/2019 | Pettersson et al. | |
| 2004/0227751 A1* | 11/2004 | Anders | G06T 7/80 345/419 |
| 2014/0320661 A1* | 10/2014 | Sankar | H04N 23/62 348/158 |
| 2016/0007026 A1 | 1/2016 | Dong et al. | |
| 2018/0152682 A1* | 5/2018 | Wozniak | G06T 3/0043 |
| 2018/0227579 A1 | 8/2018 | Shen et al. | |
| 2019/0289322 A1 | 9/2019 | Abbas et al. | |

FOREIGN PATENT DOCUMENTS

| | | | |
|---|---|---|---|
| JP | 2005020478 A | * | 6/2003 |
| JP | 2005027046 A | * | 7/2003 |
| JP | 2005020478 A | * | 1/2005 |
| JP | 2005027046 A | * | 1/2005 |
| JP | 3687159 B2 | * | 8/2005 |
| JP | 2006-005533 A | | 1/2006 |
| JP | 3746739 B2 | * | 2/2006 |
| KR | 10-2004-0005290 A | | 1/2004 |

OTHER PUBLICATIONS

Tsunashima N Translation of JP-2005027046, Jul. 2003 (Year: 2003).*
Ebihara T Translation of JP-3746739, Jun. 2002 (Year: 2002).*
Ishiguro T Translation of JP-2005020478, Jun. 2003 (Year: 2003).*
Extended European Search Report dated Feb. 5, 2021 for European Patent Application No. 20191260.7.
Yeping Su, Ming-Ting Sun and V. Hsu, "Global motion estimation from coarsely sampled motion vector field and the applications," Proceedings of the 2003 International Symposium on Circuits and Systems, 2003. ISCAS '03., 2003, pp. 232-242 (2005).
X. Chen, Z. Zhao, A. Rahmati, Y. Wang and L. Zhong, "Sensor-Assisted Video Encoding for Mobile Devices in Real-World Environments," in IEEE Transactions on Circuits and Systems for Video Technology, vol. 21, No. 3, pp. 335-349, (Mar. 2011).

* cited by examiner

WEARABLE CAMERA AND A METHOD FOR ENCODING VIDEO CAPTURED BY THE WEARABLE CAMERA

FIELD OF INVENTION

The present invention relates to video encoding, and specifically to encoding video captured by a wearable camera.

TECHINICAL BACKGROUND

Wearable cameras are used, e.g., by police officers, for capturing a video stream during patrols and incidents. Such cameras may also be referred to as body worn cameras, BWCs. Wearable cameras are typically battery powered. Hence, there are limitations in power available for a wearable camera. Furthermore, wearable cameras may transmit a captured video stream via a wireless connection. Hence, the bitrate available for such transmission is also a limiting factor in relation to encoding of the video stream.

SUMMARY

Facilitating bitrate savings and/or battery savings for a video stream generated by a wearable camera would be beneficial.

According to a first aspect a method for encoding video captured by a wearable camera comprises determining a centre of rotation for an image frame to be encoded. The centre of rotation relates to a rotation of the wearable camera at the time of capturing the video. The image frame comprises multiple groups of pixels. The method further comprises setting compression levels for the multiple groups of pixels of the image frame, wherein the compression levels for the multiple groups of pixels of the image frame are such that a level of compression increases with a radial distance from the centre of rotation. The method further comprises encoding the image frame using the compression levels.

Rotational movements of a wearable camera occur when in use and such rotational movements lead to movements in the captured images. For such rotational movements, the movement of groups of pixels between consecutive image frames will increase with a radial distance from a centre of rotation in the image frame corresponding to a centre of rotation of an image sensor of the wearable camera. This will result in an increased risk of failure of identification of motion vectors with a radial distance from the centre of rotation which will lead to problem with high bitrates, thereby increasing the risk of having to encode blocks of pixels using intra-coding instead of generally less bit-consuming inter-coding. This risk will be more prominent for motion estimation algorithms best suited for (e.g., by configuration/optimization) identification of translational motion. Thus, a specific compression principle is introduced where the level of compression is increased with the radial distance from the centre of rotation.

By increasing the level of compression with the radial distance from the centre of rotation, the total bitrate required to encode a video including the image frame is reduced in relation to if the level of compression would have been uniformly the same as the level of compression in the centre of rotation.

Reducing the bitrate is beneficial, e.g., in that the bandwidth required for wirelessly transmitting the resulting video stream is reduced and the storage space required for storing a resulting video stream is reduced.

Due to the increased risk of failure of identification of motion vectors with the radial distance from the centre of rotation, the bitrate cost for groups of pixels will generally also increase with the radial distance from the centre of rotation of the groups of pixels. Hence, increasing the level of compression with the radial distance from the centre of rotation will result in a higher level of compression for groups of pixels for which the bitrate cost would have been higher.

Furthermore, as the effects of motion blur will generally increase with a radial distance from the centre of rotation, it is advantageous to enable higher image quality (resolution) by means of lower compression closer to the centre of rotation where the motion blur is generally at is lowest.

As portions of the image frame closer to the centre of rotation may also be portions that are of more interest than more peripheral portions further away from the centre of rotation, it is advantageous to enable higher image quality (resolution) by means of lower compression closer to the centre of rotation.

Additionally, as the effects of motion blur will generally increase with the radial distance from the centre of rotation, the loss of image quality further away from the centre of rotation will matter less since the effects of motion blur further away from the centre of rotation would have affected the image quality anyway.

The groups of pixels may for example be referred to as blocks, macroblocks, or coding tree units.

The compression levels for the multiple groups of pixels of the image frame may for example be compression values, such as values of quantization parameters for the multiple groups of pixels of the image frame.

The act of determining the centre of rotation of the method may further comprise determining the centre of rotation using data from one or more movement sensors in the wearable camera.

The method may further comprise determining motion vectors for the image frame. The act of determining the centre of rotation may then further comprise determining the centre of rotation using the motion vectors.

The method may further comprise determining a preliminary centre of rotation for the image frame and setting a motion vector search area including the preliminary centre of rotation, wherein the motion vector search area is a subarea of the image frame. The act of determining the motion vectors may then comprise determining the motion vectors in the motion vector search area. The reliability of determined motion vectors is generally decreased with the radial distance from the centre of rotation. Hence, selecting a motion vector search area which is a subarea of the image and that includes the preliminary centre of rotation will exclude an area of the image frame that includes the motion vectors that would be the least reliable. Consequently, a more reliable identification of the centre of rotation is enabled.

The method may further comprise obtaining a previous centre of rotation for a previous image frame. The act of determining a preliminary centre of rotation may then comprise determining the preliminary centre of rotation for the image frame to correspond to the previous centre of rotation. The centre of rotation tends to move around between consecutive image frames but not to a very large extent. Hence, the previous centre of rotation, i.e., the centre of rotation of a previous image frame, is a good approximation to use as the preliminary centre of rotation. Preferably, the previous centre of rotation is the centre of rotation of the immediately preceding image frame.

The method may further comprise determining an angular velocity of the wearable camera at a time of capturing the image frame. In the act of setting the compression levels, a rate of increase of the level of compression with the radial distance from the centre of rotation may then be based on the angular velocity. The incentive to increase the level of compression becomes larger with the amount of motion in the image frame. For a rotation, the motion in the image frame depends on the radial distance from the centre of rotation but also on the angular velocity. For a higher angular velocity, the motion will be higher at the same radial distance from the centre of rotation. Hence, it is beneficial not only to increase the level of compression with the radial distance from the centre of rotation but also the rate of increase based on the angular velocity. The loss of image quality for a higher angular velocity will matter less since the effects of motion blur at the higher angular velocity would have affected the image quality anyway.

The method may further comprise determining motion vectors for the image frame. In the act of setting the compression levels, a rate of increase of the level of compression with the radial distance from the centre of rotation may then be based on the motion vectors. For example, the rate of increase of the level of compression may be based on a rate of increase of the length of the motion vectors with the radial distance from the centre of rotation.

According to a second aspect a non-transitory computer readable medium is provided. The non-transitory computer readable medium has instructions, possibly in the form of computer readable program code, stored thereon which when executed on a device having processing capability is configured to perform the method of the first aspect. The device having processing capability may be a wearable camera, e.g., a body worn camera.

The above-mentioned features of the method according to the first aspect, when applicable, apply to this second aspect as well. In order to avoid undue repetition, reference is made to the above.

According to a third aspect a wearable camera is provided. The wearable camera comprises an image sensor, circuitry and an encoder. The image sensor is configured to capture image data. The circuitry is configured to execute a centre of rotation determining function configured to determine a centre of rotation for an image frame to be encoded. The centre of rotation relates to a rotation of the wearable camera at the time of capturing the video. The image frame is based on the image data and comprises multiple groups of pixels. The circuitry is further configured to execute a compression level setting function configured to set compression levels for the multiple groups of pixels of the image frame, wherein the compression levels for the multiple groups of pixels of the image frame are such that a level of compression increases with a radial distance from the centre of rotation. The encoder is configured to encode the image frame into a video stream using the compression levels set by the compression level setting function.

The wearable camera may further comprise a movement sensor for determining movement data for the wearable camera. The centre of rotation determining function may then be further configured to determine the centre of rotation using the movement data from the movement sensor.

The encoder of the wearable camera may be further configured to determine motion vectors for the image frame. The centre of rotation determining function may then be further configured to determine the centre of rotation using the motion vectors.

The circuitry of the wearable camera may be further configured to execute a preliminary centre of rotation determining function configured to determine a preliminary centre of rotation for the image frame, and a motion vector search area setting function configured to set a motion vector search area including the preliminary centre of rotation, the motion vector search area being a subarea of the image frame. The encoder may then be configured to determine the motion vectors in the motion vector search area.

The circuitry of the wearable camera may be further configured to execute a previous centre of rotation obtaining function configured to obtain a previous centre of rotation for a previous image frame. The preliminary centre of rotation determining function may then be configured to determine the preliminary centre of rotation for the image frame to correspond to the previous centre of rotation.

The circuitry of the wearable camera may be further configured to execute an angular velocity determining function configured to determine an angular velocity of the wearable camera at a time of capturing the image frame. In the compression level setting function, a rate of increase of the compression levels with the radial distance from the centre of rotation may then be based on the angular velocity.

The encoder of the wearable camera may further be configured to determine motion vectors for the image frame. In the compression level setting function, a rate of increase of the level of compression with the radial distance from the centre of rotation may then be based on the motion vectors.

A further scope of applicability of the present embodiments will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that the embodiments are not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects will now be described in more detail, with reference to appended figures. The figures should not be considered limiting but are instead used for explaining and understanding. Like reference numerals refer to like elements throughout.

DETAILED DESCRIPTION

The present embodiments will now be described more fully hereinafter with reference to the accompanying drawings, in which currently preferred embodiments are shown.

However, they may be embodied in many different forms and should not be construed as limited to the embodiments set forth herein. Rather, these embodiments are provided for thoroughness and completeness, and to convey the scope of the claims to the skilled person.

Figure 1:
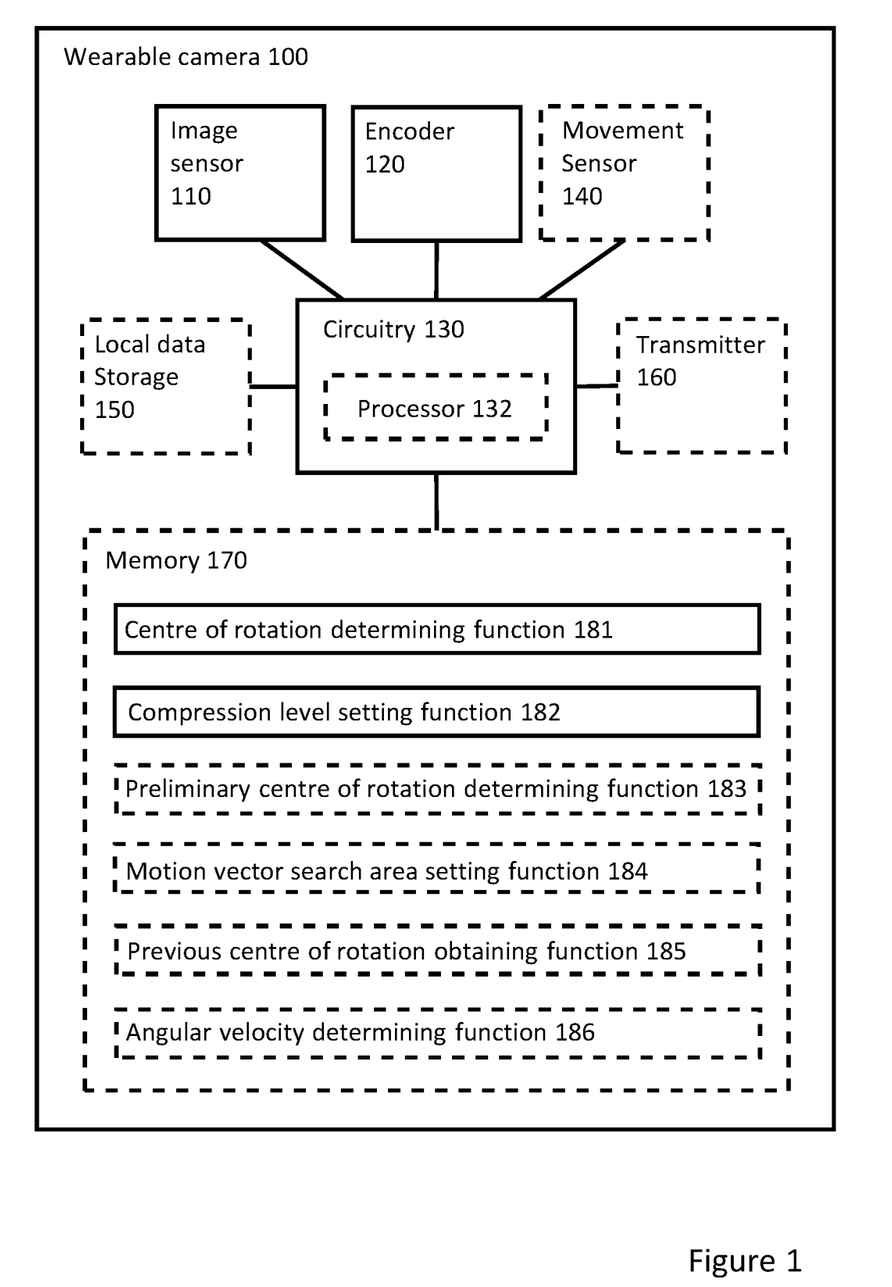
FIG. 1 is a schematic block diagram of a wearable camera.

FIG. 1 illustrates a wearable camera 100. The wearable camera 100 may be a body worn camera, BWC. The wearable camera 100 may be a separate unit or it may be integrated in another unit, such as in a helmet, glasses etc. The wearable camera 100 may be used, e.g., by police officers, for capturing video and possibly other data during patrols and incidents. Captured data may subsequently be needed as evidence, for example when investigating crimes and prosecuting suspected criminals. In order to preserve the captured data, a data management system external from the wearable camera 100, such as a video management system or an evidence management system, may be used. Such data management systems generally provide storage of captured data, and also viewing of the captured data, either in real time or as a playback of recorded data. Typically, the wearable camera 100 is battery powered and has a limited bitrate. The latter may be due to limited local data storage and/or limitations in bandwidth for a wireless connection to the data management system or to a central where a live feed is viewed. Furthermore, the limitation in bandwidth for the wireless connection may vary over time such that the bitrate occasionally becomes even more limited. The wearable camera 100 comprises an image sensor 110, circuitry 130, and an encoder 120.

The image sensor 110 is configured to capture image data. The image data may, e.g., be data of image frames. Image sensors and capturing of image data are well known for the person skilled in the art and will not be discussed in any more detail in this disclosure.

The encoder 120 is configured to encode image data captured by the image sensor 110 into a video stream, sometimes the video stream provided by the encoder 120 is referred to as an encoded video stream. Typically, the video encoder 120 is configured to encode some of the image frames of the video stream as intra frames or key frames and some of the image frames of the video stream as inter frames or delta frames. An intra frame is an encoded video frame that does not require information from other encoded video frames to be decoded. Hence, an intra frame is encoded based on information from the image frame of video data it is set to correspond to. Typically, similarities within the image frame are used to encode the image frame into an intra frame. In video encoding an intra frame is often referred to as an I-frame. The image frames of the video stream in between two intra frames are encoded as inter frames. Typically, an inter frame only comprises changes that occur from one frame to the next. Hence, inter frames are typically comprising less data than intra frames. In video encoding an inter frame is often referred to as a P-frame or a B-frame. P-frames refer to previous frames for data reference. Hence, the content of previous frames must be known in order to decode a P-frame. B-frames may refer to both previous and forward frames for data reference. Hence, the content of both the previous and forward frames must be known in order to decode a B-frame. When encoding an inter frame, an image frame is divided into multiple groups of pixels. The groups of pixels may for example be referred to as blocks, macroblocks, or coding tree units. The image frame is compared to a reference frame. For example, the reference frame for encoding a P-frame is a previous image frame. A matching algorithm is used to identify matching groups of pixels between the image frame to be encoded and the reference frame and if a match is found for a group of pixels, that group of pixels may be encoded as a motion vector specifying how the group of pixels has moved in the image frame since the reference frame. Determining motion vectors is sometimes referred to as motion estimation. If the movement is large due to fast movement of the camera or of objects in the captured scene, the motion estimation may fail in identifying motion vectors. The fewer motion vectors identified for an image frame to be encoded, the larger the resulting encoded inter frame will become in bit size and hence, the larger bandwidth will be required to transmit the encoded inter frame.

The circuitry 130 is configured to carry out functions of the wearable camera 100. The circuitry 130 may include a processor 132, such as a central processing unit (CPU), microcontroller, or microprocessor. The processor 132 is configured to execute program code. The program code may for example be configured to carry out the functions of the wearable camera 100.

The wearable camera 100 may further comprise a movement sensor 140 for determining movement data for the wearable camera. The movement sensor 140 is configured to measure movement data of the wearable device. The movement sensor 140 may comprise a gyroscope and/or an accelerometer. The gyroscope is configured to measure movement data in the form of orientation and/or angular velocity of the wearable camera 100. The accelerometer is configured to measure movement data in the form of acceleration (or rate of change of velocity) of the wearable camera 100 in its own instantaneous rest frame. The movement sensor 140 is configured to sample the movement data as a function of time.

The wearable camera 100 may further comprise a local data storage 150. The local data storage 150 may be configured to store the video stream. The local data storage typically has a limited data storage capacity. The local data storage 150 may be any type of local data storage suitable for storage of a video stream. For example, the local data storage 150 may be in the form of an SD card reader and an SD card. Another example of a local data storage 150 may be in the form of a flash memory, e.g., a NAND flash.

The wearable camera 100 may further comprise a transmitter 160. The transmitter 160 may be configured to wirelessly transmit the video stream to the data management system. The transmitter 160 may be configured to continuously transfer the captured video stream to the video management system. The wireless transfer is typically limited due to bandwidth available for the wireless transfer.

The wearable camera 100 may further comprise a memory 170. The memory 170 may be one or more of a buffer, a flash memory, a hard drive, a removable media, a volatile memory, a non-volatile memory, a random access memory (RAM), or another suitable device. In a typical arrangement, the memory 170 may include a non-volatile memory for long term data storage and a volatile memory that functions as system memory for the circuitry 130. The memory 170 may exchange data with the circuitry 130 over a data bus. Accompanying control lines and an address bus between the memory 170 and the circuitry 130 also may be present.

Functions of the wearable camera 100 may be embodied in the form of executable logic routines (e.g., lines of code, software programs, etc.) that are stored on a non-transitory computer readable medium (e.g., the memory 170) of the wearable camera 100 and are executed by the circuitry 130 (e.g., using the processor 132). Furthermore, the functions of the wearable camera 100 may be a stand-alone software application or form a part of a software application that carries out additional tasks related to the wearable camera 100. The described functions may be considered a method that a processing unit, e.g., the processor 132 of the circuitry 130 is configured to carry out. Also, while the described functions may be implemented in software, such functionality may as well be carried out via dedicated hardware or firmware, or some combination of hardware, firmware and/or software.

The circuitry 130 is configured to execute a centre of rotation determining function 181. The centre of rotation determining function 181 is configured to determine a centre of rotation for an image frame to be encoded. The centre of rotation relates to a rotation of the wearable camera at the time of capturing the video. Specifically, the centre of rotation for the image frame corresponds to an image sensor centre of rotation around which the wearable camera 100 rotates at the time of capturing the image data on which the image frame is based. The image frame is typically divided into multiple groups of pixels used in the encoding of the image frame.

The circuitry 130 is configured to execute a compression level setting function 182. The compression level setting function 182 is configured to set compression levels for the multiple groups of pixels of the image frame. The compression levels for the multiple groups of pixels of the image frame are set such that a level of compression increases with a radial distance from the centre of rotation. Generally, if a first group of pixels is at a larger radial distance from the centre of rotation than a second group of pixels, the first group of pixels will have a higher level of compression than the second group of pixels. The level of compression may be continuously increased with the radial distance from the centre of rotation. However, the level of compression may also be increased stepwise such that first groups of pixels within a first radial distance range from the centre of rotation have the same first level of compression, second groups of pixels within a second radial distance range from the centre of rotation including radial distances larger than the first radial distance range have the same second level of compression, etc.

Increasing the level of compression may further be done non-uniformly such that for example, the level of compression is increased at a higher rate with the distance from the centre of rotation in a horizontal direction than with the distance in a vertical direction. For such a non-uniform increase, a level of compression at a given distance from the centre of rotation along a horizontal line from the centre of rotation will have be higher than the level of compression at the given distance from the centre of rotation along a line that is at an angle larger than 0 degrees from the centre of rotation. Generally, the level of compression may not only be based on the need of compression due to the higher degree of motion further away from the centre of rotation but also on an expected level of interest in different portions of the image frame. It may for example be so that the periphery of the image frame in horizontal direction is of less interest than the periphery of the image frame in the vertical direction.

Compression levels may relate to different measures and properties that indicate a level of compression. For example, the compression levels may relate to compression values, such as values of a quantization parameter such that the values of the quantization parameter are set such that they are increased with the radial distance from the centre of rotation. In such a case, if a first group of pixels is at a larger radial distance from the centre of rotation than a second group of pixels, the first group of pixels will have a higher value of the quantization parameter than the second group of pixels. This may for example be achieved by means of a gradient quantization parameter map (QMAP).

The compression levels may further describe or indicate the bitrate required for encoding. Hence, as long as the bitrate required becomes lower, the level of compression is considered to become higher regardless of the means or process used to achieve the lower bitrate required. For example, the level of compression may be increased by means of using a different encoding scheme for blocks depending on the radial distance from the centre of rotation. Examples of such encoding is the use of skip blocks or DC coded (i.e., single colour) I blocks for groups of images which would result in a higher level of compression in relation to encoding them as ordinary P or B blocks. A skip block has no image information or prediction information and a decoder interprets a skip block as a block (group of pixels) being identical to the corresponding block (group of pixels) of a previous frame. A skip block may still have a motion vector, which it inherits from its neighbours. However, no information is encoded. To increase the level of compression, the selection of type of block (I, P, skip) could be biased so that the probability of block types corresponding to higher level of compression is increased with the distance from the centre of rotation.

The encoder 120 may then be configured to encode the image frame into a video stream using the compression levels set by the compression level setting function 182.

The increased compression level with the radial distance from the centre of rotation will decrease the bitrate of a video stream of such encoded frames, and will be lower than the bitrate would have been if the video stream would have included image frames having the same compression level at the centre of rotation but without any increase of compression level with the radial distance from the centre of rotation. Furthermore, increasing the compression level with the radial distance from the centre of rotation will maintain high quality (low compression) for groups of pixels closer to the centre of rotation. This is beneficial since these groups of pixels are less affected by motion blur, require less bitrate for encoding, are easier to find corresponding motion vectors for, and often relate to regions of interest since they depict what is straight in front of the wearable camera. Furthermore, most of the reduced bitrate is achieved by higher compression level at the periphery in relation to the centre of rotation. Higher level of compression for such groups of pixels is beneficial since these groups of pixels are more affected by motion blur, require higher bitrate for encoding, are more difficult to find corresponding motion vectors for, and often relate to regions of less interest since they depict what is in the periphery in relation to the centre of rotation. As compared to increasing the compression uniformly in the image frame and reducing the frame rate, such methods for bitrate reduction would not achieve the above identified benefits.

The centre of rotation determining function 181 may be configured to determine the centre of rotation using the movement data from the movement sensor 140 for example comprising a gyroscope and/or an accelerometer.

The encoder 120 may be configured to determine motion vectors for the image frame. The centre of rotation determining function 181 is further configured to determine the centre of rotation using the motion vectors. For a rotational motion, the motion vectors will produce a circular pattern around the centre of rotation and increase in length with a radial distance from the centre of rotation. Hence, the identified motion vectors may be analysed using a suitable algorithm to determine the centre of rotation.

The circuitry 130 may be configured to execute a preliminary centre of rotation determining function 183 and a motion vector search area setting function 184. The preliminary centre of rotation determining function 183 is configured to determine a preliminary centre of rotation for the image frame. The motion vector search area setting function 184 is configured to set a motion vector search area including the preliminary centre of rotation, wherein the motion vector search area is a subarea of the image frame. The encoder 120 may then be configured to determine the motion vectors in the motion vector search area. The centre of rotation determining function 181 may then be configured to determine the centre of rotation using the motion vectors in the motion vector search area. The basis for this is that the reliability of determined motion vectors generally decreases with the radial distance from the centre of rotation since the radial distance a group of pixel moves between two consecutive image frames increases with the radial distance from the centre of rotation which in turn makes determination of motion vectors increasingly difficult. Hence, using only the motion vectors in the subarea will exclude an area of the image frame that includes the motion vectors that would be the least reliable. Hence, a more reliable identification of the centre of rotation is enabled. The motion vector search area may, for example, be set such that it includes groups of pixels for which the motion vectors may be determined with a desired reliability. The encoder 120 may then be configured to determine the motion vectors of the image frame outside the motion vector search area. However, such motion vectors would then only be used by the encoder 120 to encode the image frame and not be used by the centre of rotation determining function 181 to determine the centre of rotation.

The encoder 120 may alternatively be configured to determine the motion vectors of the image frame only in the motion vector search area. In such a case, the motion vector search area may be set to exclude groups of pixels for which the encoder 120 has a probability of failing to determine motion vectors over a threshold. The probability of failing will increase with an increased motion. Hence, the groups of pixels excluded may be elected as groups of pixels more than a threshold radial distance from the preliminary centre of rotation. The threshold radial distance may for example be based on an angular velocity. For the excluded groups of pixels, i.e., groups of pixels for which no motion vectors have been determined, the level of compression can be further increased to compensate for the additional bitrate required for encoding without any identified motion vectors. The increased level of compression can be achieved by means of adapting quantization parameter values for the groups of pixels for which no motion vectors have been determined. In alternative, the groups of pixels for which no motion vectors have been determined may be encoded as skip blocks or DC coded (i.e., single colour) I blocks.

The circuitry 130 may be configured to execute a previous centre of rotation obtaining function 185. The previous centre of rotation obtaining function 185 is configured to obtain a previous centre of rotation for a previous image frame. The preliminary centre of rotation determining function 183 may then be configured to determine the preliminary centre of rotation for the image frame to correspond to the previous centre of rotation. As the centre of rotation generally does not move very far between consecutive image frames, using the previous centre of rotation for the previous image frame will generally be a good approximation to use as the preliminary centre of rotation.

The circuitry may be configured to execute an angular velocity determining function 186. The angular velocity determining function 186 is configured to determine an angular velocity of the wearable camera at a time of capturing the image frame. The compression level setting function 182 may then be configured such that a rate of increase of the level of compression with the radial distance from the centre of rotation is based on the angular velocity. Generally, the level of compression should be increased with increased amount of motion in the image frame. For a rotation, the amount of motion in the image frame depends on the radial distance from the centre of rotation but also on the angular velocity. For a higher angular velocity, the amount of motion will be larger at a same radial distance from the centre of rotation than it would have been for a lower angular velocity. Hence, the level of compression may be increased at a higher rate with the radial distance from the centre of rotation for higher angular velocity such that the level of compression will be higher at a same radial distance from the centre of rotation than it would have been for a lower angular velocity. The angular velocity may be determined by means of data from the movement sensor 140, e.g., by means of a gyroscope.

Alternatively, or additionally, based on motion vectors determined by the encoder 120, the compression level setting function 182 may be configured such that a rate of increase of the level of compression with the radial distance from the centre of rotation is based on the motion vectors. For example, for a higher angular velocity, the determined motion vectors will increase in length with the radial distance from the centre of rotation at a higher rate than they would for a lower angular velocity. Hence, the rate of increase of the level of compression may be set to be proportional to the rate of increase of the length of the motion vectors with the radial distance from the centre of rotation. Analogously, the level of compression for the groups of pixels may be set to be proportional to the length of their respective motion vectors.

Figure 2:
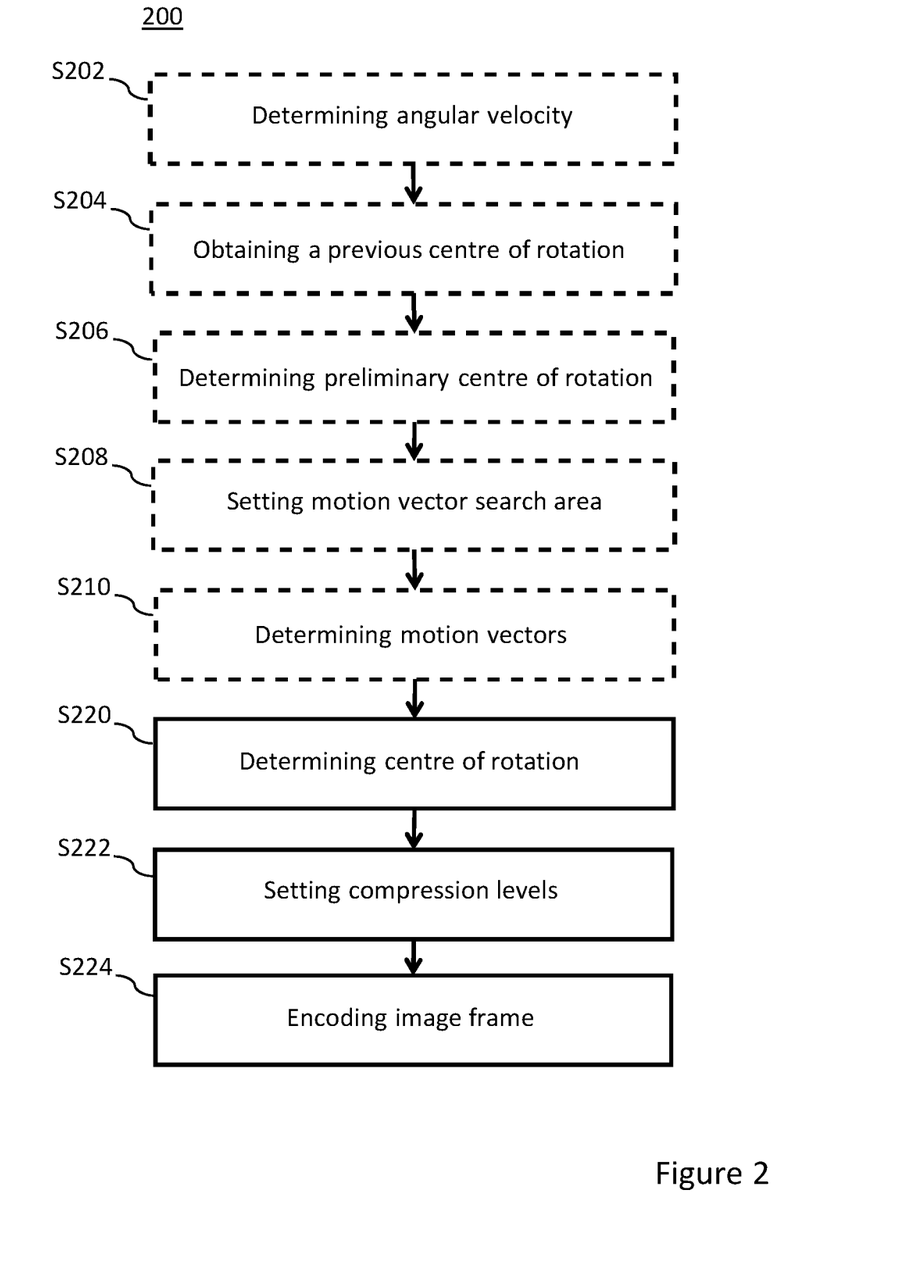
FIG. 2 is a flow chart of a method for encoding video captured by a wearable camera.

In connection with FIG. 2 a method 200 for encoding video captured by a wearable camera will be discussed. The method 200 is based on the insight made by the inventor that by increasing a compression level with a radial distance from a centre of rotation, the bitrate required for encoding may be reduced without a correspondingly large loss of quality, e.g., since the higher level of compression will apply for groups of pixels which would have carried less relevant information and/or would have had a lower quality even without the higher level of compression.

Some of all the steps of the method 200 may be performed by the functions of the wearable camera 100 described above. The method comprises the following steps. Unless a step specifically depends on the result of another step, the steps may be performed in any suitable order.

The method comprises determining S220 a centre of rotation for an image frame to be encoded, the centre of rotation relating to a rotation of the wearable camera at the time of capturing the video, and the image frame comprising multiple groups of pixels. The method 200 further comprises setting S222 compression levels for the multiple groups of pixels of the image frame, wherein the compression levels for the multiple groups of pixels of the image frame are such that a level of compression increases with a radial distance from the centre of rotation. The method 200 further comprises encoding S224 the image frame using the compression levels.

The determining S220 of the centre of rotation may further comprise determining the centre of rotation using data from one or more movement sensors in the wearable camera.

The method 200 may further comprise determining S210 motion vectors for the image frame. The determining S220 of the centre of rotation may then further comprise determining the centre of rotation using data using the motion vectors.

The method 200 may further comprise determining S206 a preliminary centre of rotation for the image frame and setting S208 a motion vector search area including the preliminary centre of rotation, the motion vector search area being a subarea of the image frame. The determining S208 of the motion vectors may then comprise determining the motion vectors in the motion vector search area.

The method 200 may further comprise obtaining S204 a previous centre of rotation for a previous image frame. The determining S206 of the preliminary centre of rotation may then comprises determining the preliminary centre of rotation for the image frame to correspond to the previous centre of rotation.

The method 200 may further comprise determining S202 an angular velocity of the wearable camera at a time of capturing the image frame. In the setting S222 of the compression levels, a rate of increase of the level of compression with the radial distance from the centre of rotation is based on the angular velocity.

The method may further comprise storing the video stream in the wearable camera. The method may further comprise wirelessly transmitting the video stream from the wearable camera. The method may further comprise corresponding features to features disclosed for the wearable camera described in relation to FIG. 1.

The person skilled in the art realizes that the present teachings are not limited to the embodiments described above. On the contrary, many modifications and variations are possible within the scope of the appended claims. Such modifications and variations can be understood and effected by a skilled person in practicing the teachings, from a study of the drawings, the disclosure, and the appended claims.

The invention claimed is:

1. A method for encoding video captured by a wearable camera, the method comprising:
   determining a centre of rotation in an image frame to be encoded, the centre of rotation relating to a rotational movement of the wearable camera at the time of capturing the video, wherein the centre of rotation corresponds to an image sensor centre of rotation around which the wearable camera rotates at the time of capturing image data on which the image frame is based, and wherein the image frame comprises multiple groups of pixels;
   setting compression levels for the multiple groups of pixels of the image frame, wherein the compression levels for the multiple groups of pixels of the image frame are such that a level of compression increases with a radial distance from the centre of rotation; and
   encoding the image frame using the compression levels.

2. The method of claim 1, wherein the act of determining the centre of rotation further comprises:
   determining the centre of rotation using data from one or more movement sensors in the wearable camera.

3. The method of claim 1, further comprising:
   determining motion vectors for the image frame, wherein the act of determining the centre of rotation further comprises:
   determining the centre of rotation using the motion vectors.

4. The method of claim 3, further comprising:
   determining a preliminary centre of rotation for the image frame; and
   setting a motion vector search area including the preliminary centre of rotation, the motion vector search area being a subarea of the image frame,
   wherein the act of determining the motion vectors comprises:
   determining the motion vectors in the motion vector search area.

5. The method of claim 4, further comprising:
   obtaining a previous centre of rotation for a previous image frame,
   wherein the act of determining a preliminary centre of rotation comprises:
   determining the preliminary centre of rotation for the image frame to correspond to the previous centre of rotation.

6. The method of claim 1, further comprising:
   determining an angular velocity of the wearable camera at a time of capturing the image frame,
   wherein, in the act of setting the compression levels, a rate of increase of the level of compression with the radial distance from the centre of rotation is based on the angular velocity.

7. The method of claim 1, further comprising:
   determining motion vectors for the image frame;
   wherein, in the act of setting the compression levels, a rate of increase of the level of compression with the radial distance from the centre of rotation is based on the motion vectors.

8. A non-transitory computer readable storage medium having stored thereon instructions for encoding video captured by a wearable camera, the instructions implementing a method comprising:
   determining a centre of rotation in an image frame to be encoded, the centre of rotation relating to a rotational movement of the wearable camera at the time of capturing the video, wherein the centre of rotation corresponds to an image sensor centre of rotation around which the wearable camera rotates at the time of capturing image data on which the image frame is based, and wherein the image frame comprises multiple groups of pixels;
   setting compression levels for the multiple groups of pixels of the image frame, wherein the compression levels for the multiple groups of pixels of the image frame are such that a level of compression increases with a radial distance from the centre of rotation; and
   encoding the image frame using the compression levels.

9. A wearable camera comprising:
   an image sensor configured to capture image data;
   circuitry configured to execute:
     a centre of rotation determining function configured to determine a centre of rotation in an image frame to be encoded, the centre of rotation relating to a rotational movement of the wearable camera at the time of capturing the image data, wherein the centre of rotation corresponds to the image sensor centre of rotation around which the wearable camera rotates at the time of capturing image data on which the image frame is based, and wherein the image frame comprises multiple groups of pixels;
     a compression level setting function configured to set compression levels for the multiple groups of pixels of the image frame, wherein the compression levels for the multiple groups of pixels of the image frame are such that a level of compression increases with a radial distance from the centre of rotation;

an encoder configured to encode the image frame into a video stream using the compression levels set by the compression level setting function.

10. The wearable camera of claim 9, further comprising:
a movement sensor for determining movement data for the wearable camera,
wherein the centre of rotation determining function is further configured to determine the centre of rotation using the movement data from the movement sensor.

11. The wearable camera of claim 9, wherein the encoder is further configured to determine motion vectors for the image frame, and wherein the centre of rotation determining function is further configured to determine the centre of rotation using the motion vectors.

12. The wearable camera of claim 11, wherein the circuitry is further configured to execute:
a preliminary centre of rotation determining function configured to determine a preliminary centre of rotation for the image frame; and
a motion vector search area setting function configured to set a motion vector search area including the preliminary centre of rotation, the motion vector search area being a subarea of the image frame, and wherein the encoder is configured to determine the motion vectors in the motion vector search area.

13. The wearable camera of claim 12, wherein the circuitry is further configured to execute:
a previous centre of rotation obtaining function configured to obtain a previous centre of rotation for a previous image frame,
wherein the preliminary centre of rotation determining function is configured to determine the preliminary centre of rotation for the image frame to correspond to the previous centre of rotation.

14. The wearable camera of claim 9, wherein the circuitry is further configured to execute:
an angular velocity determining function configured to determine an angular velocity of the wearable camera at a time of capturing the image frame,
wherein, in the compression level setting function, a rate of increase of the level of compression with the radial distance from the centre of rotation is based on the angular velocity.

15. The wearable camera of claim 9, wherein the encoder is further configured to determine motion vectors for the image frame, and wherein, in the compression level setting function, a rate of increase of the level of compression with the radial distance from the centre of rotation is based on the motion vectors.

* * * * *